(12) United States Patent
Acx

(10) Patent No.: US 7,300,685 B2
(45) Date of Patent: Nov. 27, 2007

(54) STEEL WIRE WITH METAL LAYER AND ROUGHNESSES

(75) Inventor: Filip Acx, Oostkamp (BE)

(73) Assignee: NV Bekaert SA, Zwevegem (BE)

( * ) Notice: Subject to any disclaimer, the term of this patent is extended or adjusted under 35 U.S.C. 154(b) by 0 days.

(21) Appl. No.: 11/494,773

(22) Filed: Jul. 28, 2006

(65) Prior Publication Data

US 2006/0292389 A1    Dec. 28, 2006

Related U.S. Application Data

(63) Continuation of application No. PCT/EP2005/050141, filed on Jan. 14, 2005.

(30) Foreign Application Priority Data

Feb. 13, 2004   (EP)   .................... 04100556

(51) Int. Cl.
*C23C 2/06* (2006.01)
*C23C 2/26* (2006.01)
*C23C 2/38* (2006.01)
*B32B 15/02* (2006.01)

(52) U.S. Cl. .............. 427/360; 72/47; 72/53; 29/527.2; 428/626; 428/659; 428/687

(58) Field of Classification Search .............. None
See application file for complete search history.

(56) References Cited

U.S. PATENT DOCUMENTS

| | | | |
|---|---|---|---|
| 1,985,332 A | | 12/1934 | Ward |
| 3,413,832 A | * | 12/1968 | Lang et al. .................... 72/42 |
| 3,556,874 A | * | 1/1971 | McClain ...................... 428/687 |
| 4,526,839 A | | 7/1985 | Herman et al. |
| 4,859,289 A | * | 8/1989 | Nishimura et al. ......... 205/149 |
| 5,240,520 A | * | 8/1993 | Tarui et al. ................. 148/532 |
| 5,989,732 A | * | 11/1999 | Yamamoto .................. 428/632 |

FOREIGN PATENT DOCUMENTS

| | | |
|---|---|---|
| EP | 1 327 697 A1 | 7/2003 |
| GB | 2 083 378 A | 3/1982 |
| GB | 2274613 A1 * | 8/1994 |
| JP | 57-137025 * | 8/1982 |
| JP | 7-268787 * | 10/1995 |
| JP | 10-118711 * | 5/1998 |
| JP | 2003-82415 * | 3/2003 |
| WO | WO 02/00481 A1 * | 1/2002 |

OTHER PUBLICATIONS

International Search Report in PCT application No. PCT/EP2005/050141, filed Jan. 14, 2005 (2 pages), dated Aug. 16, 2005.

* cited by examiner

*Primary Examiner*—John J Zimmerman
(74) *Attorney, Agent, or Firm*—Shlesinger, Arkwright & Garvey LLP

(57) ABSTRACT

Steel wire is coated with a metal layer such that the metal layer has a surface with roughnesses. A surface roughness Ra of above 0.25 μm is reached. Preferably, the roughnesses are randomly dispersed at the surface. The result is an improved visual aspect and an increased resistance against corrosion.

15 Claims, 2 Drawing Sheets

STEEL WIRE WITH METAL LAYER AND ROUGHNESSES

This application is a continuation of application no. PCT/EP2005/050141, filed Jan. 14, 2005, which claims the priority of European application no. 04100556.2, filed Feb. 13, 2004, and each of which is incorporated herein by reference.

FIELD OF THE INVENTION

The present invention relates to a steel wire coated with a metal layer. The invention also relates to a use of such a steel wire and to a method of obtaining such a steel wire.

BACKGROUND OF THE INVENTION.

Steel wires coated with a metal layer are widely known. Tonnages of steel wires have been coated with a zinc or zinc alloy layer in order to increase the corrosion resistance of steel wires. The corrosion resistance of these steel wires is largely dependent upon the thickness of the zinc layer. The thicker the zinc layer, the longer it takes before it is corroded away and the higher the corrosion resistance, and vice versa. In some cases these steel wires with a zinc layer exhibit surface defects. These surface defects may take several forms: impurities, rests of lubricants such as drawing soaps remaining at the surface, hard Fe—Zn particles, burrs, rolling errors, drawing lines, asperities, and so forth. Dependent upon the eventual use of the steel wires, these surface defects may have various drawbacks. A first drawback is that the visual or esthetic aspect of the steel wire with the metal layer is bad due to inhomogenities. A second drawback is that the surface errors may lead to peaks, which may pierce through subsequently applied thin or soft layers such as a lacquer layer or a plastic layer. A third drawback is that asperities on the surface of the metal coated steel wire may cause damage to other devices, which are or which come in contact with the steel wires. Equalizing the surface of the metal layer, e.g. by etching, in order to get rid of the surface defects, unavoidably decreases the thickness of the metal layer. In case of a zinc or zinc alloy layer, this decreased thickness means a reduced corrosion resistance. In order to have a final corrosion resistance, which meets minimum requirements, an initial thicker layer must be deposited.

OBJECTS AND SUMMARY OF THE INVENTION

It is an object of the present invention to avoid the drawbacks of the prior art.

It is another object of the present invention to provide a steel wire with a metal layer and an improved visual appearance.

It is yet another object of the present invention to provide a steel wire with a visual appearance, which is stable in time.

It is also an object of the present invention to provide a steel wire with an improved visual appearance without decreasing the corrosion resistance. It is again an object of the present invention to provide a simple way of improving the visual appearance of a steel wire with a coated metal layer.

According to a first aspect of the present invention, there is provided a steel wire coated with a metal layer. The metal layer on the steel wire may be zinc or a zinc alloy, such as a zinc aluminum alloy with 1% to 10% aluminum, up to 0.2% of a Mischmetal and the remainder zinc. The metal layer on the steel wire may also be tin or a tin alloy. The steel wire and the metal layer are in a work hardened state by either rolling or drawing or both.

This means that after having been coated with a metal layer, the thus coated steel wire has been subjected to a work hardening treatment such as a rolling or a drawing treatment or both. The metal layer has a surface with roughnesses so that a surface roughness Ra of above 0.25 µm, e.g. above 0.5 µm, e.g. 1.0 µm, e.g. above 1.20 µm is reached on this surface. The terms "surface roughness Ra" refer to the arithmetical mean roughness Ra. The arithmetical mean roughness Ra can be determined sampling a section of standard length from the mean line on the roughness chart. The mean line is laid on a Cartesian coordinate system wherein the mean line runs in the direction of the X-axis and magnification is the Y-axis. The value obtained is expressed in micrometer (µm). In case of a round wire, the X-axis runs on the surface of the round wire and in the direction of the axis of the round wire. In case of a flat wire, the X-axis lies in the plane of one of the sides of the flat wire. The Y-axis is always perpendicular to the surface of the wire and to the X-axis.

The advantage of the invention is that due to the presence of the roughnesses, the visual defects on the surface of the coated steel wire are masked or have disappeared due to the roughening treatment.

Preferably the roughnesses are randomly dispersed at the surface.

Even with the relatively low degree of a surface roughness Ra ranging from 0.50 µm to 1.50 µm, the surface errors largely disappear and the visual aspect considerably improves. Moreover, an equally dull outlook is obtained, which is stable in time.

This stability is in contrast with a shiny appearance of a galvanized prior art wire just after leaving the hot dip bath. The degree of shining of a prior art wire disappears in time during use of the galvanized wire. If the surface roughness is obtained by e.g. a sand or grit blasting technique, the steel wire has the advantage of having a metal layer, which is compacted as a result of the sand or grit blasting operation.

The metal layer becomes less porous and denser. This compacted layer may result in an equal or even in an increased resistance against corrosion, despite the fact that some metal has been taken away during the sand blasting.

The steel wire may have a round cross-section, a flat cross-section with natural edges, a flat cross-section with forced edges, a rectangular cross-section, a square cross-section or any other profile, such as a I- a C-or a zeta profile. A steel wire is to be distinguished from a steel sheet or a steel plate. A steel wire has a cross-section with a width-to-thickness ratio ranging maximum up to 10/1, normally up to 8/1 or 5/1. Round wires or square wires have a width-to-thickness ratio of 1/1.

The surface roughnesses may be present on the entire surface of the 35 steel wire. However, this is not always necessary. In case of a wire with a rectangular or a square cross-section, the roughnesses may be only present on some but not all of the wire sides. It may be sufficient if the roughnesses have been provided only on the surface which is to come into contact with other devices, or only on the surface which is to be coated with a lacquer or with a thin plastic coating, or only on the surface with is exposed to visual inspection.

The steel wire may be coated with a thin plastic layer on the metal layer, such as polyamide, polyester, or polyvinyl chloride. In a preferable embodiment of the invention, the steel wire is coated with a lacquer layer on the metal layer.

As the surface of the metal layer has been roughened equally without high protruding peaks, the thin plastic or lacquer layer covers completely the outer surface of the steel wire and no peaks pierce through the plastic or lacquer layer.

This is particularly true in case the plastic layer is provided by means of powder spraying, since powder spraying is more sensitive to such peaks than extrusion.

According to a second aspect of the invention, the steel wire can be used in several applications. A very useful application of the invention wire is the use as a wiper arm for wipers. The wiper arm connects the wiper blade with the wiper motor. Another use of the invention wire is as a reinforcement rail for the wiper element of a window wiper. Still another use of the invention wire is as spring wire where the roughnesses present on the surface of the coating provide an excellent reserve tank for the presence of a lubricant. Without the presence of the roughnesses, 50% to 80% of the lubricant applied to the wire falls from the wire due to gravity. In case of the invention, the roughnesses keep the lubricant on the surface of the wire. One of the advantages is that power springs made according to the invention and provided with lubricant, make less noise.

According to a third aspect of the invention, there is provided a method of smoothing away surface errors on an elongated steel element. The method comprises the following steps:

a) providing a steel wire;
b) coating the steel wire with a metal layer resulting in a coated steel wire; this coated steel wire is drawn or rolled;
c) applying a surface treatment to the coated steel wire in order to smoothen away surface errors, said surface treatment resulting at least partially in a surface roughness Ra above 0.5 µm.

Preferably, the surface treatment comprises sand or grit blasting since this results in a randomly dispersed pattern of the roughnesses.

BRIEF DESCRIPTION OF THE DRAWINGS

The invention will now be described into more detail with reference to the accompanying drawings wherein.

DETAILED DESCRIPTION OF THE INVENTION

Figure 1:
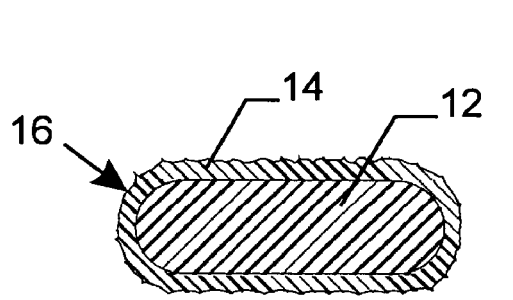
FIG. 1 is a cross-section of a first embodiment of an invention wire.

FIG. 1 is a cross-section of a first embodiment of an invention wire 10. The wire 10 is a flat high-carbon steel wire. Wire 10 has a steel core 12 and a layer 14 of a zinc aluminum alloy with about 5% aluminum and up to 0.2% of a Mischmetal such as lanthanum or 35 cerium. The wire 10 has been sand blasted so that its surface exhibits an equally dull outlook with randomly dispersed small roughnesses 16.

Figure 2A:
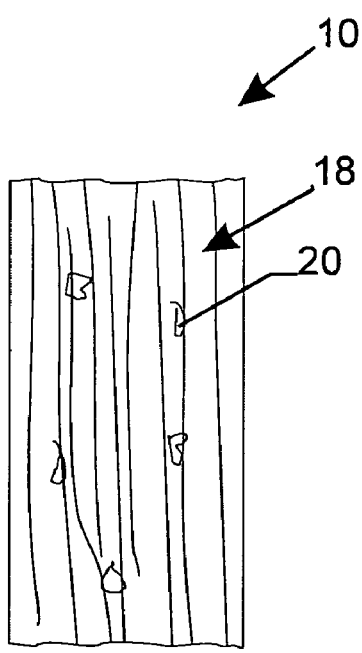
FIG. 2(a) shows a side view of a prior art wire.
Figure 2B:
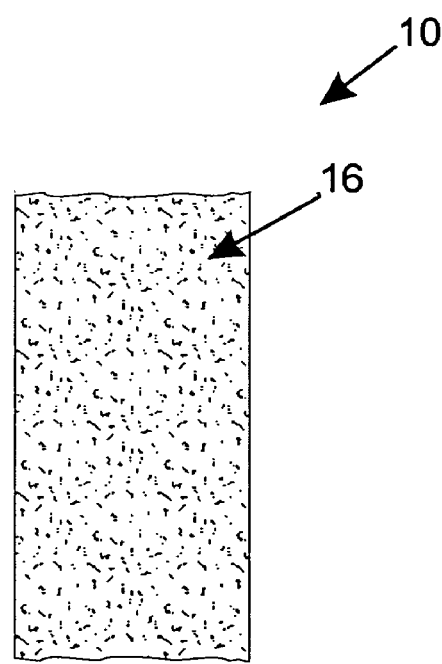
FIG. 2(b) shows a side view of an invention wire.

A steel wire 10 according to the invention may be manufactured as follows. Starting product is a high-carbon steel wire rod with e.g. following composition: a carbon content ranging from 0.20 to 0.50%, a manganese content ranging from 0.40 to 0.90%, a silicon content ranging from 0.05 to 0.40%, sulfur and phosphor contents being below 0.05%. The wire rod is drawn down to an intermediate diameter. The drawn and round high-carbon steel wire is subjected to a hot dip operation in order to coat the round steel wire with a metal layer of a zinc aluminum alloy. The coated round steel wire is then subjected to a rolling operation in order to obtain a rolled and coated steel wire with a flat cross-section, i.e. a steel wire with two flat sides and natural edges (i.e. rounded edges, in contrast with a rectangular wire with four flat sides). As a matter of example, the coated steel wire may have following dimensions (width× thickness): −7.0 mm×2.2 mm −8.0 mm×3.0 mm 20−9.0 mm×3.0 mm −9.0 mm×3.3 mm −9.0 mm×3.46 mm −9.0 mm×4.0 mm −12.0 mm×4.0 mm Reference is now made to FIG. 2(a). The rolled and coated flat steel wire 10 may exhibit some surface defects: the unevenness of the rolls is directly translated into longitudinal grooves 18 extending along the steel wire 10, hard particles 20 such as Fe—Zn particles, which are not completely solved in the zinc aluminum matrix, may be visible. Other surface defects (not shown) may be burrs, lubricant rests, lumps because of disturbances in prior hot dip coating operation . . . . The coated and rolled steel wire is then subjected to a sand or grit blasting operation, which results in invention wire 10, with randomly dispersed roughnesses 16 as illustrated in FIG. 2(b).

The blasting operation may be carried out in a dry way or in a wet way. The wet way is to be preferred because of a lower exploitation cost, a better polishing effect and a better controllability. Wet blasting may comprise three subsequent steps: a blasting phase, a rinsing phase and a drying phase. During the blasting phase, an abrasive material such as ceramic particles, steel grit or glass particles is sprayed on the coated and rolled steel wire. The form and the size of the abrasive material determine the pattern to be obtained on the wire surface. The abrasive material may be captured, filtered and recuperated in the system by means of a central pump. The abrasive material can be aluminum oxide, zirconium oxide or chromium nickel steel. The abrasive material can be in the form of balls with a diameter ranging up to 500 µm.

In experiments carried out, three coated and rolled steel wires had following features before sand blasting: −gloss (60°):166-170-roughness Ra:0.07-0.04-0.12 After sand blasting twice the three steel wires with a mixture of glass grits (80-112) and ceramic grits (Zr 097-B120), under a pressure of 3.2 bar and at a distance of 20 cm, the resulting steel wire had following features:

−gloss (60°):13 25-roughness Ra:1.67-1.23-1.58.

Salt spray tests have been carried out on the original coated and rolled steel wires and on the sand blast steel wires. The following table mentions the number of hours before DBR—dark brown rust—appears on the surface.

TABLE

|  | Spots of DBR | Locations of DBR | DBR (5%) |
| --- | --- | --- | --- |
| Original | 912 | 1032 | 1176 |
|  | 1368 |  | 1560 |
| Sand blast | 1248 | 1512 | 1560 |
|  | 912 | 1104 | 1248 |

The table clearly shows that there is not a substantial decrease in corrosion resistance despite the disappearance of some coating 5 material due to sand blasting.

The roughnesses may be realized on the surface of the coated and rolled steel wire in still other ways such as by means of brushes out of hard metal. The use of brushes, however, does not result in a randomly dispersed pattern of roughnesses. Brushes create multiple lines on the surface.

Figure 3:
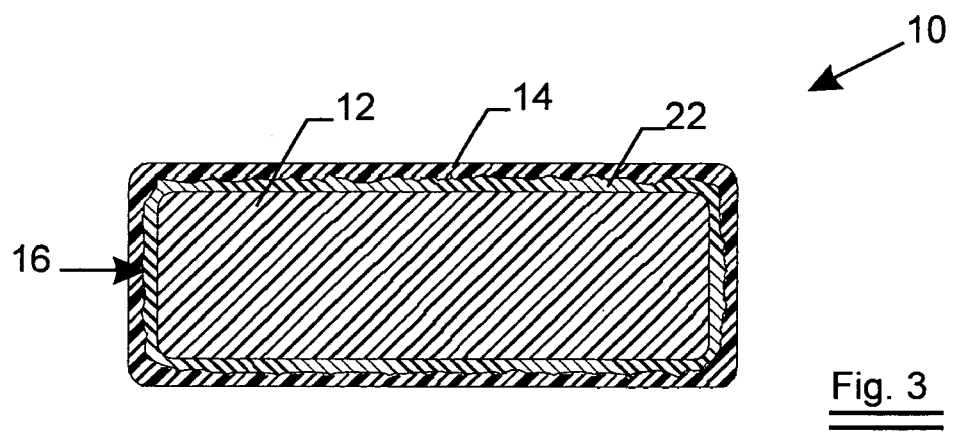
FIG. 3 is a cross-section of a second embodiment of an invention wire.

FIG. 3 gives a cross-section of a second embodiment of an invention wire 10. The wire 10 has a rectangular cross-section. The wire 10 has a steel core 12, a zinc metal layer 14 which has been sand blasted so that roughnesses 16 are present at the surface of metal layer 14. Above the metal layer 14 is a thin lacquer layer 22. Since the roughnesses are all controlled and asperities have been avoided, the lacquer layer 22 completely covers the surface of the metal layer 14 without any peaks piercing through the thin lacquer layer. As a matter of example, the thickness of the lacquer layer ranges from 10 µm to 50 µm, preferably from 20 µm to 40 µm.

Figure 4:
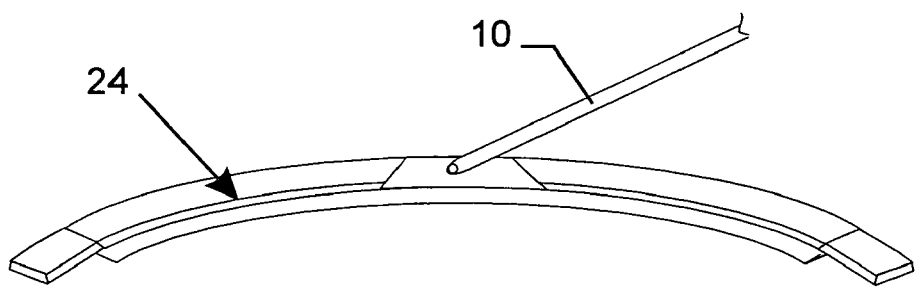
FIG. 4 illustrates a use of an invention wire as a wiper arm.

FIG. 4 illustrates an appropriate and suitable use of an invention wire 10. The invention wire 10 functions as wiper arm between a wiper motor (not shown) and the wiping element 24, which rests on the window. The wiper arm performs a to and fro oscillating movement.

Figure 5:
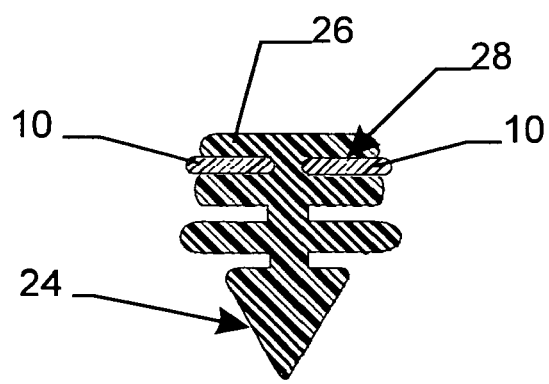
FIG. 5 illustrates a use of an invention wire as a reinforcement rail for a window wiper element.

FIG. 5 shows the cross-section of a wiping element 24. The wiping element is made of blade rubber 26 and has various slots 28. Invention wires 10 function as reinforcement rails and are located in the upper slots 28.

While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention or limits of the claims appended hereto.

The invention claimed is:

1. A method of smoothing away surface errors on an elongated steel element, the method comprising the following steps:
   a) providing an elongated steel element in the form of a steel wire;
   b) coating the steel wire with one of a zinc and a zinc alloy layer resulting in a coated steel wire;
   c) after the coating of the steel wire, then rolling the coated steel wire into a flat wire to thereby create surface errors on the coated flat wire and to thereby obtain a rolled and coated steel wire with a flat cross-section; and
   d) applying a surface treatment to the flat steel wire in order to smoothen away surface errors, the surface treatment resulting at least partially in a surface roughness Ra above 0.5 µm.

2. A method according to claim 1, wherein the surface treatment comprises sand or grit blasting.

3. A method according to claim 2, wherein the surface treatment renders the one of zinc and a zinc alloy layer less porous and denser.

4. A method according to claim 3, wherein:
   a) the flat steel wire with a flat cross-section includes a rectangular cross-section.

5. A method according to claim 2, wherein:
   a) the flat steel wire with a flat cross-section includes a rectangular cross-section.

6. A method according to claim 1, further comprising the step of:
   a) providing a lacquer layer on the one of a zinc and a zinc alloy layer.

7. A method according to claim 6, wherein:
   a) the flat steel wire with a flat cross-section includes a rectangular cross-section.

8. A method according to claim 1, wherein:
   a) the flat wire has two or more sides; and
   b) the applying of a surface treatment to the flat wire includes applying the surface treatment to only some of the two or more sides of the flat wire.

9. A method according to claim 8, wherein:
   a) the flat steel wire with a flat cross-section includes a rectangular cross-section.

10. A method according to claim 1, wherein:
    a) the surface treatment renders the one of zinc and a zinc alloy layer less porous and denser.

11. A method according to claim 10, wherein:
    a) the flat steel wire with a flat cross-section includes a rectangular cross-section.

12. A method according to claim 1, wherein:
    a) the flat steel wire with a flat cross-section includes a rectangular cross-section.

13. A method of smoothing away surface errors on an elongated steel element, the method comprising the following steps:
    a) providing an elongated steel element in the form of a steel wire;
    b) after the providing of the steel wire, then coating the steel wire with one of a zinc and a zinc alloy layer to thereby result in a coated steel wire;
    c) after the coating of the steel wire, then rolling the coated steel wire into a flat wire to thereby create surface errors on the coated flat wire and to thereby obtain a rolled and coated steel wire with a flat cross-section and with surface errors; and
    d) after the rolling of the coated steel wire, then applying a surface treatment to the coated flat steel wire with surface errors to thereby smoothen away surface errors, the applying of the surface treatment resulting at least partially in a surface roughness Ra above 0.5 µm.

14. A method according to claim 13, wherein:
    a) the applying of a surface treatment to the coated flat steel wire with surface errors includes a sand blasting operation.

15. A method according to claim 13, wherein:
    a) the applying of a surface treatment to the coated flat steel wire with surface errors includes a grit blasting operation.

* * * * *